(12) United States Patent
Kimura

(10) Patent No.: US 6,941,130 B2
(45) Date of Patent: Sep. 6, 2005

(54) INFORMATION PROVIDING APPARATUS, COMPUTER PROGRAM PRODUCT AND INFORMATION PROVIDING METHOD

(75) Inventor: Makoto Kimura, Kanagawa-ken (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 292 days.

(21) Appl. No.: 10/345,199

(22) Filed: Jan. 16, 2003

(65) Prior Publication Data

US 2003/0144012 A1 Jul. 31, 2003

(30) Foreign Application Priority Data

Jan. 28, 2002 (JP) .................................. P2002-019108

(51) Int. Cl.$^7$ .............................................. H04M 3/42
(52) U.S. Cl. .............................. 455/414.3; 455/414.1; 455/414.2; 455/412.1; 455/566; 455/569.2; 455/575.9; 455/403
(58) Field of Search ......................... 455/414.3, 414.1, 455/414.2, 566, 569.2, 575.9, 403, 422, 99, 434; 709/217; 345/169

(56) References Cited

U.S. PATENT DOCUMENTS

| | | | |
|---|---|---|---|
| 5,148,153 A | 9/1992 | Haymond | |
| 6,809,724 B1 * | 10/2004 | Shiraishi et al. ............ | 345/169 |
| 2001/0019956 A1 * | 9/2001 | Tada .......................... | 455/434 |
| 2002/0065074 A1 * | 5/2002 | Cohn et al. ................. | 455/422 |
| 2002/0112026 A1 * | 8/2002 | Fridman et al. ............ | 709/217 |
| 2002/0164962 A1 * | 11/2002 | Mankins et al. ............. | 455/99 |
| 2004/0036622 A1 * | 2/2004 | Dukach et al. ......... | 340/691.6 |
| 2004/0224699 A1 * | 11/2004 | Bull ........................ | 455/456.1 |
| 2005/0022140 A1 * | 1/2005 | Vale .......................... | 715/864 |

FOREIGN PATENT DOCUMENTS

| | | |
|---|---|---|
| EP | 0 901 000 A | 3/1999 |
| JP | 9-123848 | 5/1997 |
| JP | 9-287974 | 11/1997 |
| JP | 10-105055 | 4/1998 |
| JP | 10-153437 | 6/1998 |
| JP | 10-288528 | 10/1998 |
| JP | 11-55417 | 2/1999 |
| JP | 11-311545 | 11/1999 |
| JP | 2001-343979 A | 12/2001 |

* cited by examiner

*Primary Examiner*—Sonny Trinh
*Assistant Examiner*—Phuoc Doan
(74) *Attorney, Agent, or Firm*—McDermott Will & Emery LLP

(57) ABSTRACT

An information providing apparatus, a computer program and an information providing method are disclosed as at least including an information providing sequence setting section 4a for automatically setting the sequence in which the information is provided, a traveling status discriminating section 4b for discriminating a traveling speed of a vehicle, an information providing initiation discriminating section 4c for discriminating initiation in which the information is provided to the vehicle occupant, and an information providing mode change-over section 4d for executing change-over between a first information providing mode to permit the information to be provided in a sequence set with an input unit 7 and a second information providing mode to permit the information to be provided in a sequence set with the information providing sequence setting section 4a, based on resulting discrimination of the traveling status discriminating section 4b when the information providing initiation discriminating section 4c discriminates an initiation in which the information is provided.

10 Claims, 3 Drawing Sheets

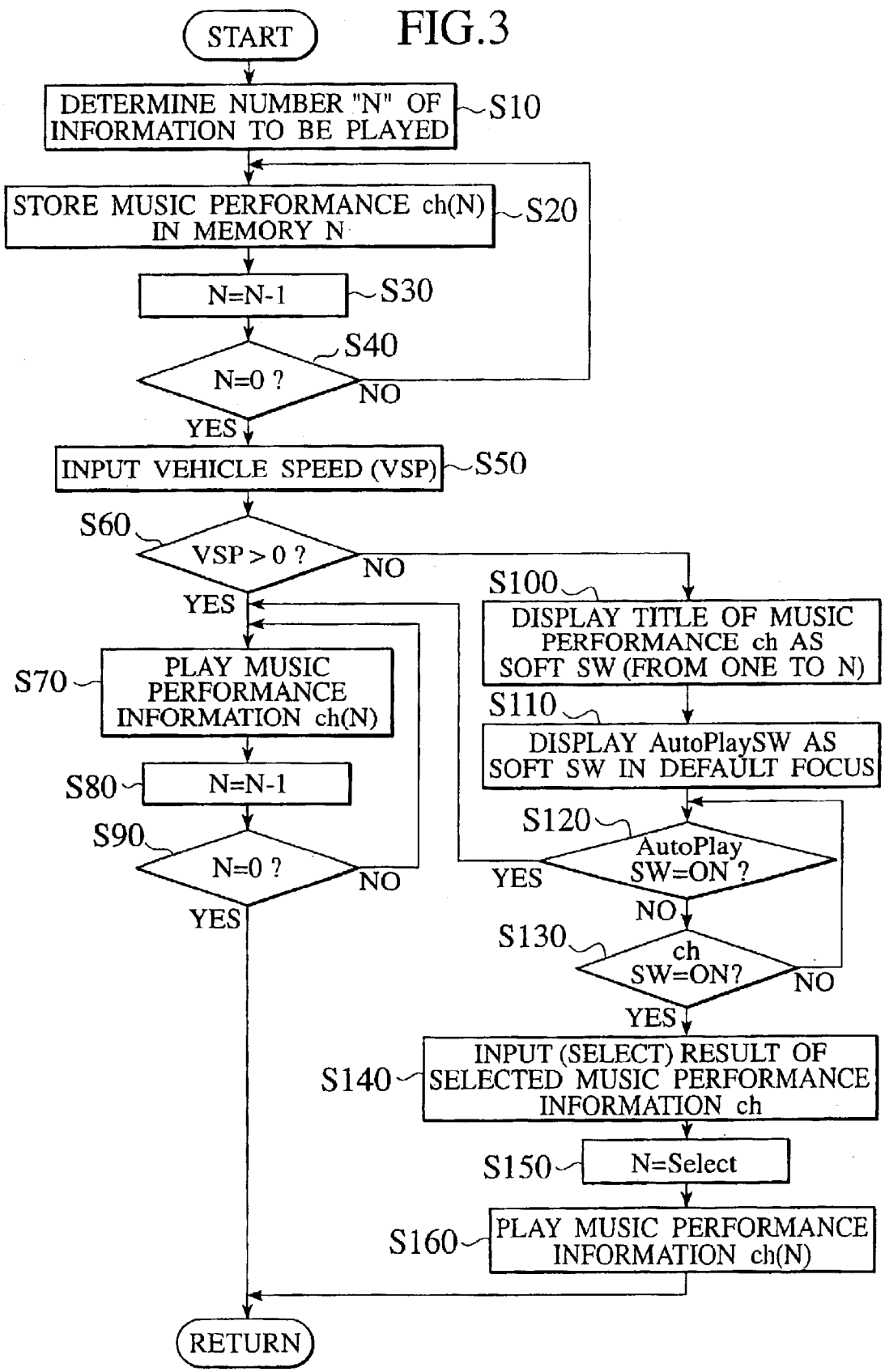

INFORMATION PROVIDING APPARATUS, COMPUTER PROGRAM PRODUCT AND INFORMATION PROVIDING METHOD

BACKGROUND OF THE INVENTION

The present invention relates to information providing apparatuses for installation in moving objects such as vehicles and, more particularly, to a technology that enables information providing modes to be suitably altered depending on a traveling status of a vehicle.

In recent years, attempts have heretofore been made to use an information providing apparatus in which a portable phone is mounted in a vehicle to allow the portable phone to receive an information content (such as image information and music information) of various kinds, via a network system, which is provided to a driver of the vehicle or other vehicle occupant. With such an information providing apparatus, the information content of the various kinds received with the portable phone is provided to the driver or the other vehicle occupant for perusal to allow suitable selection obtaining a desired information content. In an event that music performance information is received as the information content, received information is reproduced as music in the vehicle.

Further, various structures are known which, when selecting a desired content among a plurality of contents, a monitor is rendered to provide a display of the various contents to allow a desired content to be selected through operation of the selection switches. With such information providing method, the driver is likely to stare the screen of the monitor during driving of the vehicle. To address such an issue, nowadays, another approach is made to provide a method to allow the plural contents to be consecutively read out in a sequential fashion while providing a display of the read-out content. The use of such a method is effective to avoid a probability of the driver tending to stare the monitor screen.

SUMMARY OF THE INVENTION

However, in some instances where the above method is adopted for sequentially reading out and displaying the plural contents, the above method tends to be similarly carried out in the same sequence set forth above even when the vehicle stands halt. Thus, the content is automatically selected in an undesired sequence with a resultant lack in convenience regardless of the fact in that the driver can afford to read the various content and select detailed information.

In order to address such an inconvenience, although an information providing apparatus may be arranged to have a structure for enabling detailed perusal through another perusal operation, the driver needs to perform different operations between the driving state and the halt state of the vehicle, resulting in a poor operability.

The present invention has been completed to address the above-described issues encountered in the related art and has an object to provide an information providing apparatus, a computer program product useful such an apparatus, and an information providing method which can suitably alter modes of providing an information content depending on a traveling status of a moving object.

To achieve the above object, a first aspect of the present invention provides an information providing apparatus, for a moving object, adapted to permit a plurality of information provided through radio communication to be provided over at least one of a voice section and a display section, comprising an input operation unit arbitrarily setting a sequence in which the information is provided, an information providing sequence setting section automatically setting the sequence in which the information is provided, a traveling status discriminating section discriminating a traveling status of a moving object, an information providing initiation discriminating section discriminating an initiation at which the information is provided, and an information providing mode change-over section executing change-over between a first information providing mode to permit the information to be provided in a sequence preset with the input operation unit and a second information providing mode to permit the information to be provided in a sequence determined with the information providing sequence setting section, wherein the information providing mode change-over section is operative to change over between the first information providing mode and the second information providing mode in response to a resulting discrimination of the traveling status discriminating section when the information providing initiation discriminating section discriminates the initiation at which the information is provided.

According to a second aspect of the present invention, there is provided an information providing apparatus adapted to be connected with an information center through radio communication to receive a plurality of information to permit desired information to be provided over at least one of a voice section and a display section in a moving object, comprising a memory unit storing information received from the information center, an input operation unit arbitrarily setting a sequence in which the information is provided, an information providing sequence setting section automatically setting the sequence in which the information is provided, a traveling status discriminating section discriminating a traveling status of a moving object, and an information providing mode change-over section executing change-over between a first information providing mode to permit the information to be provided from the memory unit in a sequence preset with the input operation unit and a second information providing mode to permit the information to be provided from the memory unit in a sequence determined with the information providing sequence setting section, wherein the information providing mode change-over section is operative to change over between the first information providing mode and the second information providing mode in response to a resulting discrimination of the traveling status discriminating section.

According to a third aspect of the present invention, there is provided a computer program product in an information providing apparatus, for a moving object, adapted to permit a plurality of information provided through radio communication to be provided over at least one of a voice section and a display section in a moving object, comprising means for arbitrarily inputting a sequence in which the information is provided, means for automatically setting a sequence in which the information is provided, means for discriminating a traveling status of a moving object, means for discriminating an initiation at which the information is provided, and means for executing change-over between a first information providing mode to permit the information to be provided in a sequence preset with the inputting means and a second information providing mode to permit the information to be provided in a sequence determined with the information providing sequence setting means, wherein the change-over executing means is operative to change over between the first information providing mode and the second information providing mode in response to a resulting discrimination of the traveling status discriminating means when the initiation discriminating means discriminates the initiation at which the information is provided.

According to a fourth aspect of the present invention, there is provided a computer program product in an information providing apparatus adapted to be connected with an information center through radio communication to receive a plurality of information to be provided over at least one of a voice section and a display section in a moving object, comprising memory means storing information received from the information center, means for inputting a sequence in which the information is provided to be arbitrarily set, means for automatically setting a sequence in which the information is provided, means for discriminating a traveling status of a moving object, and means for executing change-over between a first information providing mode to permit the information to be provided in a sequence preset with the inputting means and a second information providing mode to permit the information to be provided in a sequence determined with the information providing sequence setting means, wherein the change-over executing means is operative to change over between the first information providing mode and the second information providing mode in response to a resulting discrimination of the traveling status discriminating means.

According to a fifth aspect of the present invention, there is provided a method of providing information over at least one of a voice section and a display section in a moving object utilizing a plurality of information received through radio communication, the method comprising arbitrarily setting a sequence in which the information is provided, automatically setting the sequence in which the information is provided, discriminating a traveling status of a moving object, discriminating an initiation at which the information is provided, and executing change-over between a first information providing mode to permit the information to be provided in a sequence set in the step of arbitrarily setting the sequence and a second information providing mode to permit the information to be provided in a sequence automatically set in the step of automatically the sequence, wherein the change over is executed between the first information providing mode and the second information providing mode in response to a resulting discrimination of the traveling status discriminating step when discriminating the initiation at which the information is provided.

According to an sixth aspect of the present invention, there is provided a method of providing information over at least one of a voice section and a display section in a moving object utilizing a plurality of information received through radio communication, the method comprising storing information received from the information center, arbitrarily setting a sequence in which the information is provided, automatically setting the sequence in which the information is provided, discriminating a traveling status of a moving object, and executing change-over between a first information providing mode to permit the information to be provided in a sequence set in the step of arbitrarily setting the sequence and a second information providing mode to permit the information to be provided in a sequence automatically set in the step of automatically the sequence, wherein the change over is executed between the first information providing mode and the second information providing mode in response to a resulting discrimination of the traveling status discriminating step.

BRIEF DESCRIPTION OF THE DRAWINGS

FIG. 3 is a flowchart illustrating the basic sequence of operations of a computer program product for use with the information providing apparatus of the embodiment according to the present invention.

DETAILED DESCRIPTION OF THE PREFERRED EMBODIMENTS

Figure 1:
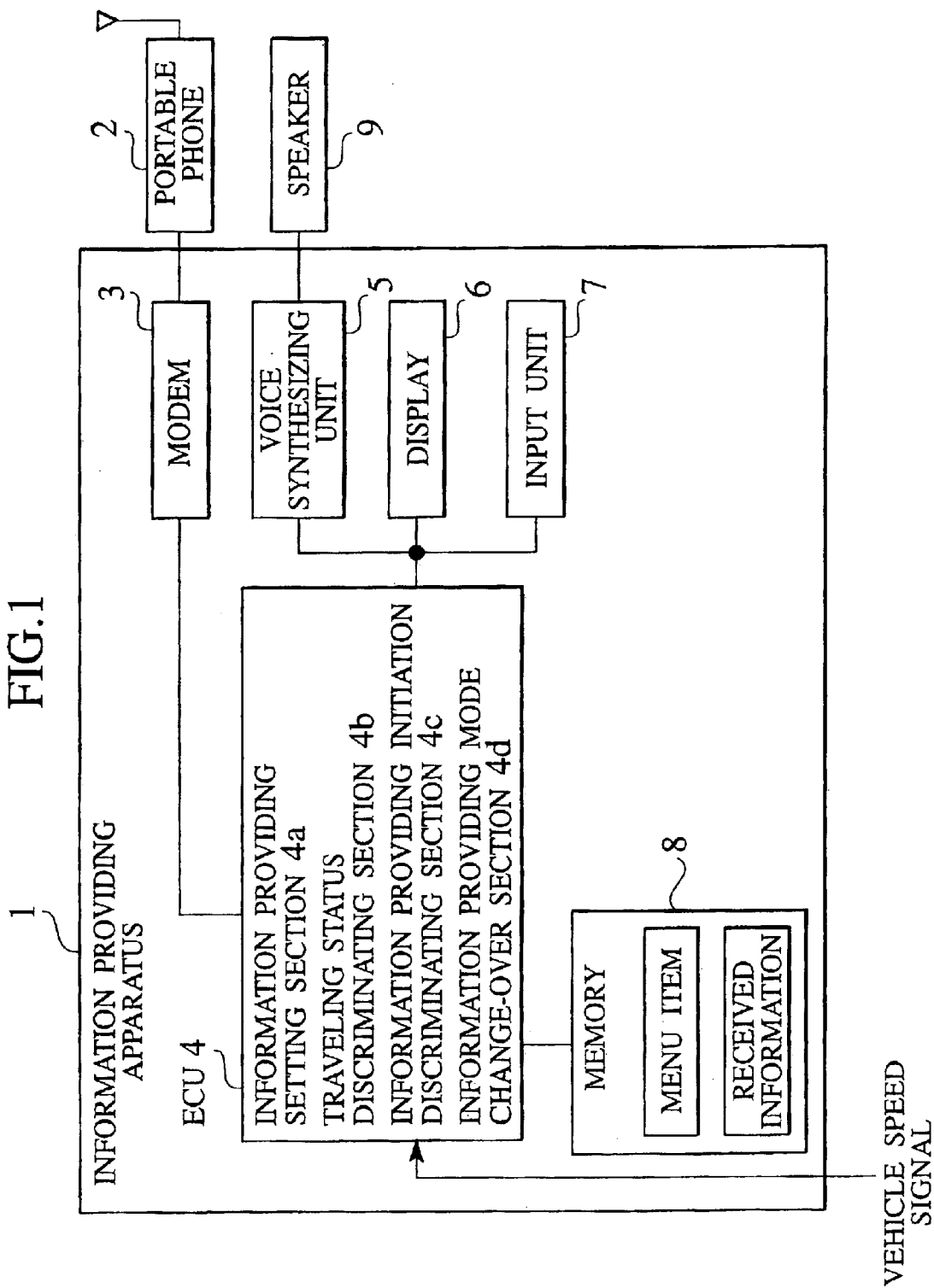
FIG. 1 is a block diagram of an information providing apparatus, for a moving object, of one exemplary embodiment according to the present invention with a pictorial representation with associated component parts.

An embodiment of the present invention will be described hereinafter in detail with reference to the drawings. FIG. 1 is a block diagram illustrating an information providing apparatus, with associated structural peripheral units, of an exemplary embodiment according to the present invention with associated peripheral units.

As shown in FIG. 1, the information providing apparatus 1 is comprised of a modem 3 that receives and demodulates data of an information content received with a portable phone 2, an ECU (electronic control unit) 4, a voice synthesizing unit 5, a display 6, an input unit 7 (an input operation unit and a change-over operation unit) that enables various operational inputs to be performed and a memory 8. With such a structure, a voice signal or a music signal outputted from the voice synthesizing unit 5 is reproduced with a speaker 9.

The ECU 4 includes an information providing sequence setting section (information providing sequence setting means) 4a that automatically determines a sequence for permitting the information content to be provided, a traveling status discriminating section (traveling status discriminating means) 4b that discriminates a traveling status such as a traveling speed of a vehicle, an information providing initiation discriminating section (information providing initiation discriminating means) 4c that discriminates a timing at which an operation for providing the information content is to be initiated, and an information providing mode change-over section (information providing mode change-over means) 4d.

The ECU 4 retrieves the information content received with the portable phone 2 and stores menu items of the information content and received information in the memory 8. Also, the ECU 4 is operative to output the information content in a sequence that is automatically determined with the information providing sequence setting section 4a.

Further, if operation is made with the input unit 7 to set a particular sequence in which the information content is provided, then in such a particular sequence, the menu items of the information content stored in the memory 8 or received information are displayed over a screen of the display 6.

The voice synthesizing unit 5 serves to synthesize voice information obtained as the information content, or music performance information to produce output signals, which are outputted from the speaker 9.

Figure 2:
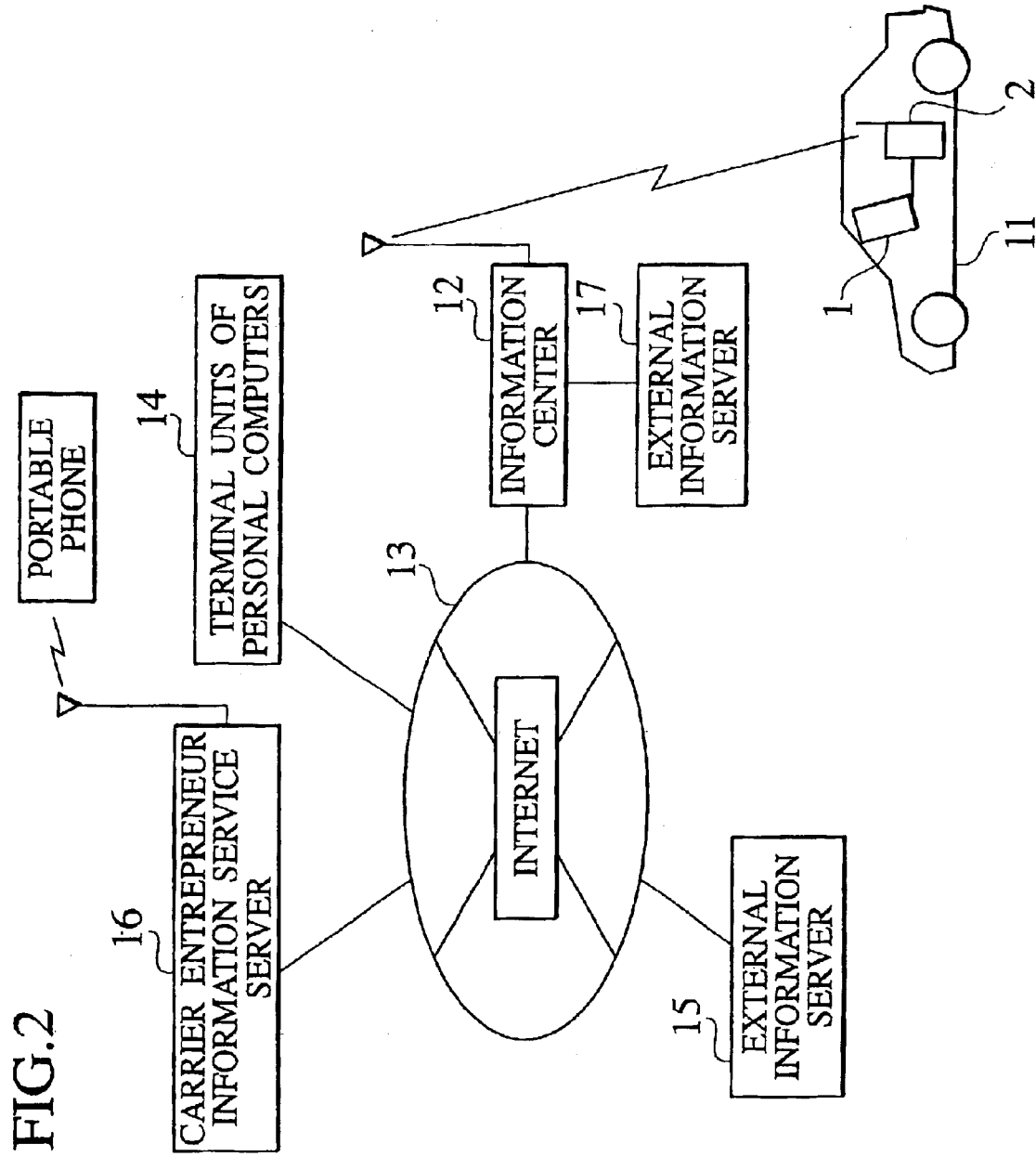
FIG. 2 is a block diagram illustrating a structure with an information center, which is able to communicate with the information providing apparatus for the moving object, and associated component parts.

FIG. 2 is a block diagram illustrating an information center 12 and associated peripheral units that are enabled to communicate with the information providing apparatus 1 shown in FIG. 1. As shown in FIG. 2, the portable phone 2 installed in the vehicle 11 is enabled to achieve radio communication with the information center 12. The information center 12 is connected to terminal units 14 of personal computers, an external information server 15 and a carrier entrepreneur information service server 16 via an Internet 13 to enable the information content of various kinds to be obtained.

Further, the information center 12 is directly connected to an external information server 17 to enable the information content of various kinds to be obtained from the external information server 17.

Now, the basic sequence of operations of a computer program product useful for the structure of the embodiment set forth above is described with reference to a flowchart of FIG. 3. Also, in this example, a description is given in conjunction with a case where the information content is comprised of received music performance information.

First, in step S10, operation is made to determine the number "N" of information to be performed for music on the basis of music performance information contained in the received information content. The number "N" of information may include a predetermined number or an operator may determine using a numeric input means (not shown). Also, information to be performed for music may include individual information (such as weather forecasts or traffic information) or may include hierarchical information groups (channeled information groups composed of individual information) containing this individual information. Additionally, music performance information may be extracted from those which are preliminarily downloaded or may be extracted each time the music performance information is downloaded.

Subsequently, in step S20, operation is conducted to store channels ch(N) of music performance information in the memory 8. The music performance information is composed of at least one of texts for images and reading out, or a source of sound.

Thereafter, in steps S30 and S40, operations are performed to store all (N-pieces) of music performance information in the memory 8 under a condition where the number "N" of information includes variables with the variables "N" being decremented one by one. Upon termination of storing operation in the memory 8, an operation result appears as "YES" in step S40 and, in step S50, the traveling status discriminating section 4b detects the traveling speed VSP of the vehicle. Also, while the traveling status discriminating section 4b is able to discriminate the traveling speed in response to the output signal from a speed meter mounted to the vehicle, an alternative approach may be conducted to discriminate whether or not the vehicle is traveling by detecting an operating status of a hand brake.

In consecutive step S60, operation is made to discriminate whether the traveling speed is greater than zero (that is, whether the vehicle is traveling), whereupon if the vehicle is regarded to remain in the traveling status, the flow is routed to step S70 and if not, the flow is routed to step S100.

During traveling status of the vehicle, in step S70, the channel ch(N) of music performance information is performed and, in step S80, the variables "N" is decremented. Then, in step S90, operation is repeated until the variables "N" reaches zero. Namely, the N-pieces of information is sequentially performed (in a second information providing mode).

On the contrary, if the traveling speed VSP of the vehicle is zero, that is, when the vehicle remains in a halt condition, then in step S100, the title of the music performance channel is displayed over the display 6 as a soft switch. Subsequently, the displayed title can be selected using a joystick, a switch and a dial such that selecting a desired title through the operation of these switch elements enables an operator's will to be transferred.

The title to be displayed may includes a content title of the channel or a list number. Further, it may be possible for the operator to select either one of or a plurality of titles to be displayed in the screen.

Further, auto play switches, for enabling automatic music performance to be selected, are displayed over the display 6 as the soft switches in combination with the titles of the music performance channels. In this instance, the auto play switches may be kept in a preliminarily selected status, i.e., in a default condition (in a first information providing mode).

Now, operation for a default focus is described hereinafter. Normally, if the item of the title is selected by some suitable means such as the joystick, the focus hits the title (that is, a display color is changed) displayed over the screen of the display 6 and, if the item of the selected title is determined, it is recognized that this item is selected. However, the presence of the default focus renders the focus to be brought into a condition to initially hit this item (auto play switch) without the need for performing the selecting operation of the items. As a consequence, when the default focus is hit, only an determining operation enables a desired switch to be turned on. Accordingly, the use of a joystick with a function to enable the item to be determined by depressing the stick provides a capability for the desired switch to be turned on in one touch.

In a consecutive step S120, if the auto play switch is depressed, the flow is routed to step S70 like in the traveling mode, causing the automatic play for music performance information to be executed in the similar sequence set forth above.

In contrast, if the auto play switch is not depressed, then in step S130, operation is made to discriminate as to whether the soft switch, displayed over the display 6, is depressed and if it is discriminated that the soft switch is depressed, then in step S140, music performance information for the selected item is selected. Subsequently, in step S150, this music performance information is retrieved from the memory 8 and, in step S160, this music performance information is played.

Thus, it is possible to alter forms of selecting respective music performance information between a situation wherein the vehicle is traveling and a situation wherein the vehicle stands halt to enable the desired music performance information to be selected.

In such an above-described manner, with the information providing apparatus 1 of the presently filed embodiment, the traveling status discriminating section 4b detects the traveling speed of the vehicle to permit the display mode to be altered such that when the vehicle is traveling, the information content is displayed in a manner to allow the driver to easily recognize the displayed item without staring the display 6 whereas when the vehicle stands halt, the information content is displayed in a manner to permit the driver to set a detailed item.

Accordingly, the desired information content can be easily selected without causing the driver from suffering from a load during the traveling of the vehicle and, during the halt of the vehicle in which the driver can afford to operate, the driver is manually operable to perform a detailed setting, resulting in an improved operability.

Further, with the information providing apparatus 1 of the presently filed embodiment, a manual operation of the driver enables a change-over between the first information providing mode and the second information providing mode and, hence, even in the presence of the halt of the moving object, it is possible for the driver to select the second information providing mode with no need for staring the screen for an extended time period.

Thus, the information providing modes can be appropriately selected according to the driver's preference, resulting in an improvement over the operability.

From the foregoing, it will be appreciated that while the present invention has been shown and described in connection with the exemplary embodiment, the present invention is not limited to the disclosed embodiment, but on the contrary, is intended to cover various modifications so as to permit various components to be replaced with arbitrary equivalent components having similar functions. Also, while the presently filed embodiment has been described in conjunction with an example where the display modes to be displayed over the display 6 are changed over between the traveling mode and the halt mode of the vehicle, the present invention is not limited to this particular example. In this respect, the information providing apparatus may be altered in structure such that by setting the vehicle speed, the display modes are automatically changed over between a speed higher than 10 Km/h and a speed less than 10 Km/h.

Further, the presently filed embodiment has been shown as described with reference to an example wherein the vehicle status discriminating means detects the traveling speed obtained from the speed meter of the vehicle, the present invention is not limited to such a specific arrangement and may employ another approach using other signals indicative of vehicle conditions.

Furthermore, although the presently filed embodiment has been described in connection with an example in which the moving object includes the vehicle, it is to be noted that the present invention is not limited to this particular example and may be applied to other moving objects other than the vehicle.

The entire content of a Japanese Application No. P2002-19108 with a filing date of Jan. 28, 2002 is herein incorporated by reference.

Although the invention has been described above by reference to certain embodiments of the invention, the invention is not limited to the embodiments described above will occur to those skilled in the art, in light of the teachings. The scope of the invention is defined with reference to the following claims.

What is claimed is:

1. An information providing apparatus, for a moving object, adapted to permit a plurality of information provided through radio communication to be provided over at least one of a voice section and a display section, comprising:

an input operation unit arbitrarily setting a sequence in which the information is provided;

an information providing sequence setting section automatically setting the sequence in which the information is provided;

a traveling status discriminating section discriminating a traveling status of a moving object;

an information providing initiation discriminating section discriminating an initiation at which the information is provided; and an information providing mode change-over section executing change-over between a first information providing mode to permit the information to be provided in a sequence preset with the input operation unit and a second information providing mode to permit the information to be provided in a sequence determined with the information providing sequence setting section;

wherein the information providing mode change-over section is operative to change over between the first information providing mode and the second information providing mode in response to a resulting discrimination of the traveling status discriminating section when the information providing initiation discriminating section discriminates the initiation at which the information is provided.

2. The information providing apparatus according to claim 1, wherein the information providing mode change-over section is operative to select the first information providing mode when the traveling status discriminating section discriminates the absence of a traveling condition of the moving object and select the second information providing mode when the traveling status discriminating section discriminates the presence of the traveling condition of the moving object.

3. The information providing apparatus according to claim 1, further comprising a change-over section changing over the information providing mode to the second information providing mode in response to a manual operation;

wherein when the change-over section is operated, the information providing mode is changed over to the second information providing mode.

4. An information providing apparatus, for a moving object, adapted to permit a plurality of information provided through radio communication to be provided over at least one of a voice section and a display section, comprising:

input operation means for arbitrarily setting a sequence in which the information is provided;

information providing sequence setting means for automatically setting the sequence in which the information is provided;

traveling status discriminating means for discriminating a traveling status of a moving object;

information providing initiation discriminating means for discriminating an initiation at which the information is provided; and information providing mode change-over means for executing change-over between a first information providing mode to permit the information to be provided in a sequence preset with the input operation means and a second information providing mode to permit the information to be provided in a sequence determined with the information providing sequence setting means;

wherein the information providing mode change-over means is operative to change over between the first information providing mode and the second information providing mode in response to a resulting discrimination of the traveling status discriminating means when the information providing initiation discriminating means discriminates the initiation at which the information is provided.

5. An information providing apparatus adapted to be connected with an information center through radio communication to receive a plurality of information to permit desired information to be provided over at least one of a voice section and a display section in a moving object, comprising:

a memory unit storing information received from the information center;

an input operation unit arbitrarily setting a sequence in which the information is provided;

an information providing sequence setting section automatically setting the sequence in which the information is provided;

a traveling status discriminating section discriminating a traveling status of a moving object; and an information providing mode change-over section executing change-over between a first information providing mode to permit the information to be provided from the memory unit in a sequence preset with the input operation unit and a second information providing mode to permit the information to be provided from the memory unit in a sequence determined with the information providing sequence setting section;

wherein the information providing mode change-over section is operative to change over between the first information providing mode and the second information providing mode in response to a resulting discrimination of the traveling status discriminating section.

6. An information providing apparatus adapted to be connected with an information center through radio communication to receive a plurality of information to permit desired information to be provided over at least one of a voice section and a display section in a moving object, comprising:

memory means storing information received from the information center;

input operation means for arbitrarily setting a sequence in which the information is provided;

information providing sequence setting means for automatically setting the sequence in which the information is provided;

traveling status discriminating means for discriminating a traveling status of a moving object; and information providing mode change-over means for executing change-over between a first information providing mode to permit the information to be provided in a sequence preset with the input operation means and a second information providing mode to permit the information to be provided in a sequence determined with the information providing sequence setting means;

wherein the information providing mode change-over means is operative to change over between the first information providing mode and the second information providing mode in response to a resulting discrimination of the traveling status discriminating means.

7. A computer program product for use with an information providing apparatus for a moving object to permit a plurality of information to be provided over at least one of a voice section and a display section, the computer program product comprising:

means for arbitrarily inputting a sequence in which the information is provided;

means for automatically setting a sequence in which the information is provided;

means for discriminating a traveling status of a moving object;

means for discriminating an initiation at which the information is provided; and means for executing change-over between a first information providing mode to permit the information to be provided in a sequence preset with the inputting means and a second information providing mode to permit the information to be provided in a sequence determined with the information providing sequence setting means;

wherein the change-over executing means is operative to change over between the first information providing mode and the second information providing mode in response to a resulting discrimination of the traveling status discriminating means when the initiation discriminating means discriminates the initiation at which the information is provided.

8. A computer program product for use with an information providing apparatus adapted to be connected with an information center through radio communication for providing a plurality of information over at least one of a voice section and a display section in a moving object, comprising:

memory means storing information received from the information center;

means for inputting a sequence in which the information is provided to be arbitrarily set;

means for automatically setting a sequence in which the information is provided;

means for discriminating a traveling status of a moving object; and means for executing change-over between a first information providing mode to permit the information to be provided in a sequence preset with the inputting means and a second information providing mode to permit the information to be provided in a sequence determined with the information providing sequence setting means;

wherein the change-over executing means is operative to change over between the first information providing mode and the second information providing mode in response to a resulting discrimination of the traveling status discriminating means.

9. A method of providing information over at least one of a voice section and a display section in a moving object utilizing a plurality of information received through radio communication, the method comprising:

arbitrarily setting a sequence in which the information is provided;

automatically setting the sequence in which the information is provided;

discriminating a traveling status of a moving object;

discriminating an initiation at which the information is provided; and executing change-over between a first information providing mode to permit the information to be provided in a sequence set in the step of arbitrarily setting the sequence and a second information providing mode to permit the information to be provided in a sequence automatically set in the step of automatically the sequence;

wherein the change over is executed between the first information providing mode and the second information providing mode in response to a resulting discrimination of the traveling status discriminating step when discriminating the initiation at which the information is provided.

10. A method of providing information over at least one of a voice section and a display section in a moving object utilizing a plurality of information received through radio communication, the method comprising:

storing information received from the information center;

arbitrarily setting a sequence in which the information is provided;

automatically setting the sequence in which the information is provided;

discriminating a traveling status of a moving object; and executing change-over between a first information providing mode to permit the information to be provided in a sequence set in the step of arbitrarily setting the sequence and a second information providing mode to permit the information to be provided in a sequence automatically set in the step of automatically the sequence;

wherein the change over is executed between the first information providing mode and the second information providing mode in response to a resulting discrimination of the traveling status discriminating step.

* * * * *